US009930116B2

(12) United States Patent
Dhamdhere et al.

(10) Patent No.: US 9,930,116 B2
(45) Date of Patent: Mar. 27, 2018

(54) METHOD AND SYSTEM FOR SELECTING A TRANSPORT MECHANISM AND A STORAGE PROCESS

(71) Applicant: Oracle International Corporation, Redwood City, CA (US)

(72) Inventors: Sachin N. Dhamdhere, Southborough, MA (US); Nirav Gandhi, Lexington, MA (US); Drupad Panchal, Pelham, NH (US); Alexander Hamilton, Beverly Hills, CA (US); Jonathan Klein, Emerald Hills, CA (US); Parmeet Arora, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 299 days.

(21) Appl. No.: 14/727,779

(22) Filed: Jun. 1, 2015

(65) Prior Publication Data

US 2016/0352833 A1    Dec. 1, 2016

(51) Int. Cl.
*G06F 15/16* (2006.01)
*H04L 29/08* (2006.01)
*H04L 29/06* (2006.01)

(52) U.S. Cl.
CPC .......... *H04L 67/1097* (2013.01); *H04L 69/18* (2013.01)

(58) Field of Classification Search
CPC ............................ H04L 67/1097; H04L 69/18
See application file for complete search history.

(56) References Cited

U.S. PATENT DOCUMENTS

| 6,185,625 | B1* | 2/2001 | Tso ................... G06F 17/30905 707/E17.121 |
| 6,247,050 | B1* | 6/2001 | Tso ......................... H04L 29/06 709/203 |
| 6,421,733 | B1* | 7/2002 | Tso ................... G06F 17/30905 358/402 |
| 6,442,601 | B1 | 8/2002 | Gampper et al. |
| 7,260,623 | B2* | 8/2007 | Wookey ............. H04L 63/0428 370/465 |

(Continued)

FOREIGN PATENT DOCUMENTS

CN    103366016 A    10/2013

OTHER PUBLICATIONS

"HTTP Made Really Easy", A Practical Guide to Writing Clients and Servers, Online Available at <http://www.jmarshall.com/easy/http/#othermethods >, retrieved on May 19, 2015, 16 pages.

(Continued)

*Primary Examiner* — Moustafa M Meky
*Assistant Examiner* — Andrea Hurst
(74) *Attorney, Agent, or Firm* — Invoke

(57) ABSTRACT

A system includes a transmitting agent configured to select a transport mechanism for transmitting a data item, and a receiving agent configured to select one or more data repositories and a storage process for storing the data item. One storage process includes storing the data item temporarily in the second data repository, and subsequently transferring the data item from the second data repository into the first data repository. Another storage process includes storing the data item into a first data repository without temporarily storing the data item in the second data repository.

20 Claims, 5 Drawing Sheets

(56) References Cited

U.S. PATENT DOCUMENTS

| | | | |
|---|---|---|---|
| 7,761,585 B2* | 7/2010 | Vellanki, Sr. | H04L 67/2823 709/203 |
| 8,316,005 B2* | 11/2012 | Moore | G06F 8/36 707/707 |
| 8,352,968 B2* | 1/2013 | Ahmed | G06F 9/54 719/328 |
| 8,364,800 B2* | 1/2013 | Bice | H04L 29/06 709/223 |
| 8,370,294 B2 | 2/2013 | Lyakhovitskiy | |
| 8,606,957 B2 | 12/2013 | Albig et al. | |
| 8,909,261 B1 | 12/2014 | Upadhyay et al. | |
| 9,092,448 B2* | 7/2015 | Skingle | G06F 17/30938 |
| 9,152,448 B2* | 10/2015 | Wang | G06F 9/45558 |
| 2006/0235831 A1 | 10/2006 | Adinolfi et al. | |
| 2007/0168396 A1* | 7/2007 | Adams | G06F 3/0607 |
| 2010/0278178 A1 | 11/2010 | Sridhar et al. | |
| 2011/0137870 A1* | 6/2011 | Feder | G06F 17/3015 707/662 |
| 2011/0295728 A1 | 12/2011 | Bulumulla et al. | |
| 2012/0179646 A1 | 7/2012 | Hinton et al. | |
| 2014/0280796 A1* | 9/2014 | Pijewski | H04L 41/0886 709/220 |
| 2014/0372171 A1 | 12/2014 | Martin, Jr. et al. | |
| 2015/0106578 A1* | 4/2015 | Warfield | G06F 3/0613 711/158 |

OTHER PUBLICATIONS

Oracle, "Database Administrator's Guide : What is the Redo Log?", Online Available at <http://docs.oracle.com/cd/B28359_01/server.111/b28310/onlineredo001.htm#ADMIN11302>, 2015, 4 pages.

Oracle, "Database Administrator's Guide: Managing Archived Redo Logs", Online Available at <http://docs.oracle.com/cd/B19306_01/server.102/b14231/archredo.htm#i1006156>, 2015, 18 pages.

Actifio, "Introducing Actifio One", http://www.actifio.com/company/blog/post/introducing-actifio-one/, May 6, 2015.

AWS, "Data Pipeline FAQs", http://aws.amazon.com/datapipeline/faqs/, May 6, 2015.

Microsoft, "Data Factory", http://azure.microsoft.com/en-in/services/data-factory/, May 6, 2015.

* cited by examiner

METHOD AND SYSTEM FOR SELECTING A TRANSPORT MECHANISM AND A STORAGE PROCESS

TECHNICAL FIELD

The present disclosure relates to transmitting and storing data items. In particular, the present disclosure relates to selecting a transport mechanism and a storage process for transmitting and storing data items.

BACKGROUND

Businesses often implement local and/or private networks for exchanging data between different devices. In some cases the data generated by different devices within the private network needs to be transmitted to a different network, such as a cloud computing environment. Devices within the private network setup a connection with devices in the cloud computing environment for transfer of the data. The connection and data transfer may be implemented using any of a set of protocols available today. For example, the connection and data transfer may be implemented using one of Hypertext Transfer Protocol (HTTP), File Transfer Protocol (FTP), Transmission Control Protocol (TCP), and/or Secure Copy (SCP).

Devices within the cloud computing environment receive and store the data for processing, analysis, and reporting. In one example, devices within the cloud computing environment prepare reports using the received data, and make the reports available for download and/or online review. In another example, applications running within the cloud computing environment, or outside of the cloud computing environment, access and perform operations based on the data received into the cloud computing environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features/components described in one embodiment may be combined with features/components described in a different embodiment. In some examples, well-known structures and devices are described with reference to a block diagram form in order to avoid unnecessarily obscuring the present invention.

A. General Overview

Various transport mechanisms are available for transporting a data item from a transmitting agent to a receiving agent. For example, a transport mechanism includes partitioning a data item into portions and transmitting each portion, separately, from the transmitting agent to the receiving agent. In another example, a transport mechanism includes transmitting a data item in a single request or command.

In one or more embodiments, a transport mechanism is selected from a set of available transport mechanisms to transmit a data item from a transmitting agent to a receiving agent. The transport mechanism is selected for transmitting the data item based on the characteristics of the data item. Examples of data item characteristics include, but are not limited to, a size of the data item, a rate at which the data item is produced, a rate at which the data item is to be transmitted, and/or a priority of the data item.

At a receiving agent, there are multiple different storage processes available for storing the data. In an example, a storage process includes temporarily storing a data item in a first data repository, and thereafter transferring the data item from the first data repository to a second data repository. Another storage process includes directly storing the data item in the second data repository without temporary storage in the first data repository.

In one or more embodiments, once a data item is received from the transmitting agent at a receiving agent, a storage process is selected from a set of storage processes available for storing the data item. In one example, a storage process is selected based on the transport mechanism that was selected by the transmitting agent. In another example, a storage process is selected based on data item characteristics.

Various storage processes involve storing data in various data repositories, which may have different characteristics. In one example, data repositories may be implemented using volatile memory or non-volatile memory. In another example, data repositories may be implemented using any of: an in-memory buffer, a hard drive file system, a distributed storage system, or a centralized storage system.

B. Architectural Overview

Figure 1:
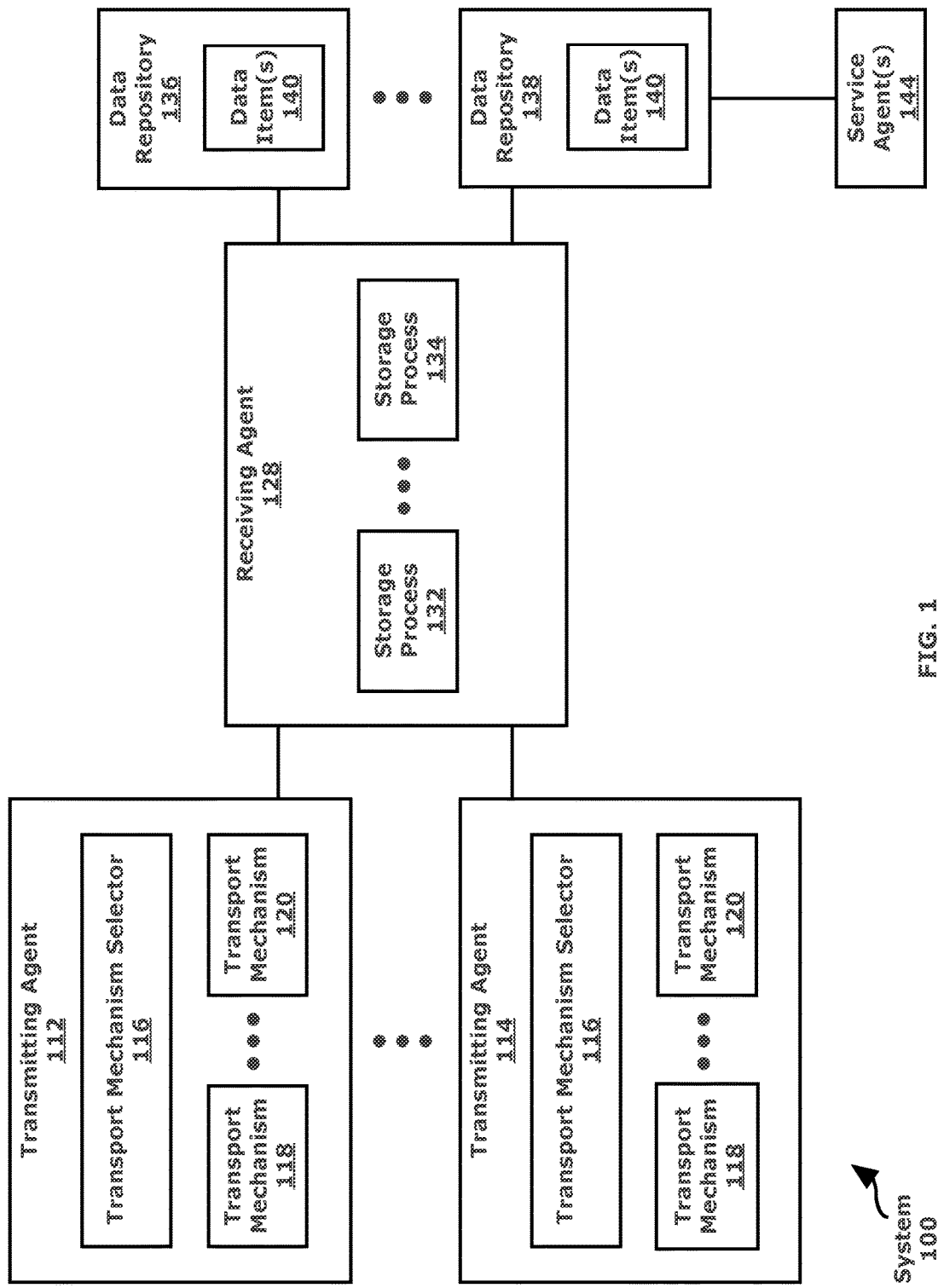
FIG. 1 shows a block diagram example of a system in accordance with one or more embodiments.

FIG. 1 illustrates an example of a system 100 in accordance with one or more embodiments. As illustrated in FIG. 1, system 100 includes one or more transmitting agents 112-114, at least one receiving agent 128, one or more data repositories 136-138, and one or more service agents 144. In one or more embodiments, system 100 may include more or less components, than the components illustrated in FIG. 1. The components illustrated in FIG. 1 may be local to or remote from each other. The components illustrated in FIG. 1 may be implemented in software and/or hardware and may be distributed over one or more applications and/or machines. In an embodiment, components within system 100 (for example, receiving agent 128 and data repository 136) are implemented on a same device. Operations described with respect to one component may instead by performed by another component.

In one or more embodiments, a data item(s) 140 is a collection of data, such as a file, log, status report, image, and/or video. In an example, a data item(s) 140 is produced or generated by one or more devices in a private network, including information related to a computing system implemented in the private network, such as metrics, incidents, configurations, compliance data, logs, and/or application performance management (APM) data.

In one or more embodiments, data item(s) 140 is associated with a set of one or more characteristics. Example characteristics of data item(s) 140 include a size, a type, a priority, an urgency, an importance, an identification (ID), a tenant identifier, a rate at which the data item is produced, a rate at which the data item is to be transmitted, a rate at which the data item is to be retrieved, and/or whether the data item is being produced or transmitted in an order in which the data item is being stored or retrieved.

In one or more embodiments, a transmitting agent 112 (or a transmitting agent 114) refers to hardware and/or software configured to perform operations described herein for transmitting a data item(s) 140 to a receiving agent 128 using one of a plurality transport mechanisms 118-120. Transmitting agent 112 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a video gaming console, a printer, a mobile handset, a smartphone, and a personal digital assistant ("PDA"). A transmitting agent includes a communications interface configured to transmit and/or receive data from another digital device. Examples include an IEEE 802.11 wireless interface, cable interface, serial interface, Ethernet interface, and network interface controller.

In an example, a transmitting agent 112 is executing on a client device implemented in a private network. A transmitting agent 112 is configured to transmit data item(s) 140, created by a device in the private network, from the private network to a receiving agent 128 external to the private network. A transmitting agent 112 may be configured to transmit data item(s) 140 originating on the same device executing the transmitting agent 112 or data item(s) 140 originating from other devices in the private network.

In an example, transmitting agent 112 and transmitting agent 114 are associated with different private networks and/or different network domains. Transmitting agent 112 and transmitting agent 114 may be associated with different companies or entities, both of which are utilizing service agent(s) 144. In an example, transmitting agents 112-114 correspond to different tenants utilizing a public cloud provided by receiving agent 128 and/or service agent(s) 144 implementing cloud services. Transmitting agents 112-114 are implemented at a transmitting end of a data pipeline.

In one or more embodiments, a transmitting agent (e.g., transmitting agent 112 and/or transmitting agent 114) includes a transport mechanism selector 116, and one or more transport mechanisms 118-120. Although the same transport protocols 118-120 are illustrated for different transmitting agents, different sets of transport mechanisms may be available at different transmitting agents.

In one or more embodiments, transport mechanism 118 is a set of protocols, formats, or defined routines for transmitting a data item from transmitting agent 112 to receiving agent 128. Transport mechanism 118 includes protocols that are used by transmitting agent 112 and receiving agent 128. Transport mechanism 118 may define a syntax, semantics, synchronization, or error recovery method for exchanging data. Transport mechanism 118 may also specify a standard communications protocol to be used, such as Hypertext Transfer Protocol (HTTP), HTTP Secure or HTTP over SSL (HTTPS), Post Office Protocol (POP), File Transfer Protocol (FTP), User Datagram Protocol (UDP), Transmission Control Protocol (TCP), Secure Copy (SCP), and/or rsync. Different transport mechanisms 118-120 may be suitable for transmitting different types of data item(s) 140.

In an example, a first transport mechanism 118 includes partitioning a data item(s) 140 into portions and transmitting each portion separately. First, a message is transmitted, notifying receiving agent 128 that data item(s) 140 is to be transmitted in portions. Then, each portion of data item(s) 140, with a respective portion identifier, is transmitted as a separate set of data packets. Finally, another message is transmitted, notifying receiving agent 128 that the last portion has been transmitted. The first transport mechanism 118 is suitable for transmitting data item(s) 140 with a large size. In an example, there is a maximum size associated with a single upload request to a receiving agent 128. Data item(s) 140 above the threshold limit will generate an error message from receiving agent 128. In another example, transmission of a large file may result in a timeout on a connection. The large amount of time necessary for transmission of a large file also increases the risk of error during transmission. Thus, sending each portion of a data item(s) 140 separately reduces the size of each upload request. On the other hand, the first transport mechanism 118 may not be suitable for high priority data item(s) 140, which need to be delivered to receiving agent 128 and/or service agent(s) 144 within a short time period. This is because overhead and inefficiencies are created when partitioning a data item(s) 140 into portions. A transport mechanism that includes partitioning a data item(s) 140 into separate portions, and sending the separate portions is referred herein as a "Chunk and Stream" transport mechanism.

In an example, a second transport mechanism 120 includes transmitting a data item(s) 140 in one request or command. Data item(s) 140 is enclosed in a body of a POST request transmitted via the HTTP protocol to receiving agent 128. POST requests receiving agent 128 to accept data item(s) 140 for storage. The second transport mechanism 120 is an efficient way to transmit data item(s) 140 with a small size.

In an example, transmitting agent 112 transmits the POST request and enclosed data item(s) 140 to an intermediary, which then forwards the POST request and enclosed data item(s) 140 to receiving agent 128. The intermediary may or may not be local to transmitting agent 112. One or more intermediaries may be used in the transmission of data item(s) 140 from transmitting agent 112 to receiving agent 128. This transport mechanism is referred herein as a "Store and Forward" transport mechanism.

Other upload instructions include, for example, a PUT request in HTTP, and/or a PUT request in FTP. Other operations corresponding to a particular transport mechanism may include compression, encryption, checksums, verifications, and/or authentication.

In one or more embodiments, transport mechanism selector 122 refers to hardware and/or software configured to perform operations described herein for selecting one of transport mechanisms 118-120 to transmit a data item(s) 140. The selection of transport mechanisms 118-120 is based on characteristics of data item(s) 140. An example set of operations for selecting a transport mechanism are described below with reference to FIG. 2.

In one or more embodiments, receiving agent 128 refers to hardware and/or software configured to perform operations described herein for causing storing of data item(s) 140 at one or more data repositories 136-138. Receiving agent 128 may be implemented on one or more servers. In an example, receiving agent 128 is a component within a public cloud that receives data item(s) 140 from multiple different tenants corresponding respectively to transmitting agents 112-114. The data item(s) 140 is stored by the receiving agent 128 in a multi-tenant virtualized environment. In an example, receiving agent 128 is implemented on a receiving end of a data pipeline.

In one or more embodiments, receiving agent 128 implements one or more storage processes 132-134. A storage process 132 refers to hardware and/or software configured to perform operations described herein for selecting one or more data repositories 136-138 and causing storage of data item(s) 140 at one or more selected data repositories. In an example, the selection of data repositories 136-138 is based on a transport mechanism 118 being used to transmit data item(s) 140, without further analyses of the characteristics of data item(s) 140. In another example, the selection of data repositories 136-138 depends also on characteristics of data item(s) 140 and/or characteristics of data repositories 136-138. In an example, storage process 134 includes storing data item(s) 140 temporarily at data repository 136, and subsequently transferring data item(s) 140 from data repository 136 into data repository 138. In another example, storage process 132 includes storing data item(s) 140 in data repository 138 without temporarily storing data item(s) 140 in data repository 136. Storage processes 132-134 may or may not cause storing of data item(s) 140 into the same set of data repositories 136-138. For example, the set of data repositories corresponding to storage process 132 may be mutually exclusive from the set of data repositories corresponding to storage process 134.

In one or more embodiments, data repository 136 (or data repository 138) is any type of storage unit and/or device (e.g., a file system, database, collection of tables, or any other storage mechanism) for storing data. Data repository 136 may be implemented using volatile or non-volatile memory. Further, data repository 136 may include multiple different storage units and/or devices. The multiple different storage units and/or devices may or may not be of the same type or located at the same physical site. Further, data repository 136 may be or may execute on the same computing system as receiving agent 128. Alternatively or additionally, data repository 136 may be on a separate computing system than receiving agent 128. Data repository 136 may be connected to receiving agent 128 via a direct connection or via a network.

In an example, data repositories 136-138 are implemented in a multi-tenant virtualized environment, and each may store data item(s) 140 for multiple tenants corresponding to transmitting agents 112-114. Each data item(s) 140 is tagged with a tenant identifier, which identifies the tenant who produced or transmitted data item(s) 140. The tenant identifier is stored with the data item(s) 140, even if the data item(s) 140 are transferred between data repositories 136-138. The tenant identifier may be used by service agent(s) 144 to access data item(s) 140 associating with a particular tenant.

In an example, data repositories 136-138 are different types of storage units and/or devices. Different types of storage units are suitable for storing different data item(s) 140. In an example, data repository 136 comprises an in-memory buffer, which is local to receiving agent 128. The in-memory buffer executes in the same device as receiving agent 128. In an example, the in-memory buffer is implemented in Read Access Memory (RAM) and/or flash memory. The in-memory buffer is configured to temporarily store data item(s) 140, which are then transferred to another data repository 138 upon a trigger event. An in-memory buffer may be suitable for temporary storage of data item(s) 140 before data item(s) 140 is transmitted to another data repository. An in-memory buffer is not suitable for permanently storing data item(s) 140, since the total capacity of the in-memory buffer is not large.

In an example, data repository 136 comprises a file system, such as a hard disk file system (HDFS), a distributed file system, a network file system, and/or a clustered file system. A file system may be implemented over multiple servers. One example of a file system is the Hadoop Distributed File System. A distributed file system is suitable for storing data item(s) 140 with a large size. A distributed file system is also suitable for storing data item(s) 140 that are to be retrieved in sequential order by service agent(s) 144. However, a distributed file system may not be suitable for separately storing a large number of data item(s) 140 in a short period of time, because each read or write of a data item(s) 140 is slow. Further, a distributed file system may have a fixed block size, each block configured to store a single data item(s) 140. If a size of data item(s) 140 is smaller than the block size, then memory space on the distributed file system would be wasted.

In one or more embodiments, service agent(s) 144 refers to hardware and/or software configured to process data item(s) 140. In an example, service agent(s) 144 provide cloud services to different tenants based on data item(s) 140 collected from the tenants. Examples of services provided by service agent(s) 144 include log analytics, application performance management (APM), monitoring, and/or other data analytics and management. Outputs of service agent(s) 144, such as reports, notifications, and/or alerts may be transmitted back to the tenant and/or another entity.

In an example, service agent(s) 144 may be able to access a subset of data repositories 136-138. For example, as illustrated, service agent(s) 144 may access data repository 138 but not data repository 136. Service agent(s) 144 may or may not be implemented in a same network as data repositories 136-138 and/or receiving agent 128. Service agent(s) 144 are able to retrieve data item(s) 140 of a relevant tenant by using the corresponding tenant identifier.

C. Select a Transport Mechanism to Transmit Data Items

Figure 2:
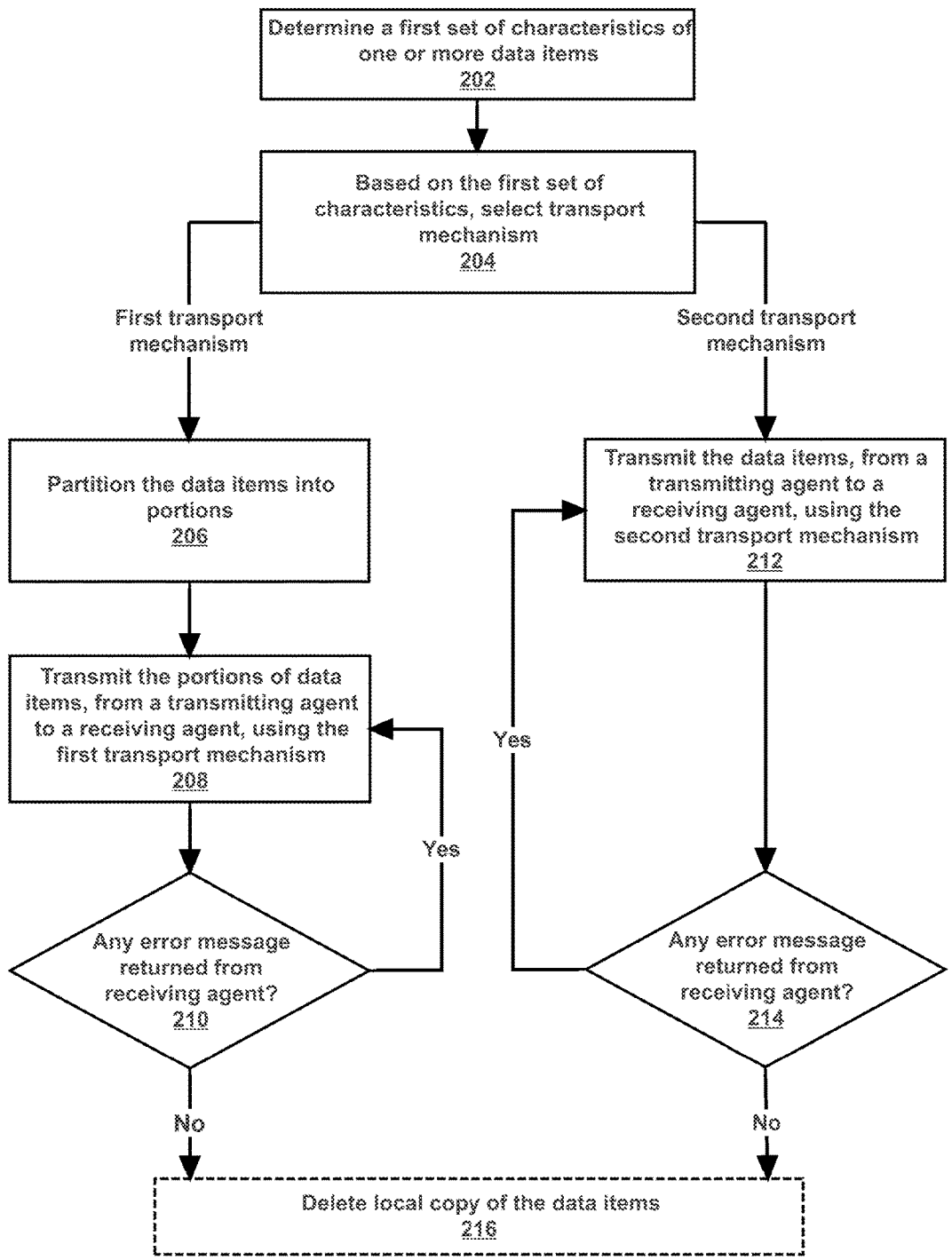
FIG. 2 shows an example set of operations for transmitting data items in accordance with one or more embodiments.

FIG. 2 illustrates an example set of operations for transmitting data items in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Initially, a first set of characteristics of one or more data items is determined by a transmitting agent (Operation 202). In an example, a data item is analyzed for a characteristic, such as a size of the data item. In another example, the characteristics are extracted from the meta-data of a data item, such as a size attribute, priority flag associated with the data item, a tenant identifier, or other attributes. In an embodiment, characteristics are determined by analyzing the way a data item is produced or generated, or the way the data item is to be stored or retrieved. For example, a data item being generated by a device is monitored, and the rate at which the data item is being generated is determined. The rate is then defined as a characteristic associated with the data. As another example, data items are determined to form video file. Since data items corresponding to a video are typically sequentially accessed, sequential access is defined as a characteristic associated with the data items.

In an embodiment, a transport mechanism is selected based on a first set of characteristics associated with the data items (Operation 204). In an embodiment, a lookup table maps characteristics of data items to suitable transport mechanisms. The lookup table is used to select the transport mechanism for transmitting a data item based on the characteristics of the data item. In one example, the lookup table indicates that a data item of a certain priority type is to be transmitted using a particular transport mechanism. In another example, a data item size greater than a threshold value is mapped to a first transport mechanism, while a data item size smaller than the threshold value is mapped to a second transport mechanism.

In an example, a first transport mechanism, as illustrated in FIG. 2, corresponds to a "Chunk and Stream" transport mechanism. The "Chunk and Stream" transport mechanism, which includes partitioning a data item into smaller portions, is suitable for data items having a large size. Thus, the "Chunk and Stream" transport mechanism is selected if the first set of characteristics of the data items indicates that a size of the data items exceeds a threshold value. Transmitting a large data item as a whole is not suitable because the receiving agent is unable to accept large data items, a timeout occurs before transmission of a large data item is complete, and/or a high risk of error is involved in transmitting a large data item.

In another example, a second transport mechanism, as illustrated in FIG. 2, corresponds to a "Store and Forward" transport mechanism. The "Store and Forward" transport mechanism is suitable for data items having a small size. Thus, the "Store and Forward" transport mechanism is selected if the first set of characteristics of the data items indicates that a size of the data items is below a threshold value. Transmitting an entire data item in a single request is more efficient, requires less overhead, and requires less processing.

The use of a particular characteristic, i.e., the size of a data item, is used in the above examples for selecting a transport mechanism. Embodiments are applicable to the use of any characteristic of a data item for selection of the transport mechanism.

In an embodiment, a first transport mechanism is selected, and the data items are partitioned into portions (Operation 206). Partitioning may be based on a desired size of each portion, the size of each data item, the type of data involved, or other factors. In an example, data items are partitioned such that each portion has a size within a certain range. The size range is selected such that each portion is suitable to be transferred in a single request. For example, the data items are logs generated by a tenant, which are transmitted from a transmitting agent once every three days. One partitioning criteria is that each portion does not exceed 50,000 KB. Another partitioning criteria is that the log information pertaining to a single day is not to be divided into two portions. The log information on a first day, second day, and third day corresponds to 25,000 KB, 30,000 KB, and 20,000 KB, respectively. Thus, the log is partitioned into a first portion of 25,000 KB, which includes the log information of the first day, and a second portion of 50,000 KB, which includes the log information of the second and third days. As a data item is being partitioned, the portions are tagged with offsets, indexes, or portion identifiers, indicating the portion's position within a data item.

In an embodiment, the portions of data items are transmitted, from a transmitting agent to a receiving agent, using the first mechanism (Operation 208). In an example, the transmission of the portions of data items begins with a transmission of an HTTP header, a notification, a message, and/or other data that indicates the first transport mechanism is being used. In an example, a request in an HTTP header, such as "X-Upload-Action='upload_start_transaction,'" indicates that the first transport mechanism is being used. This request also includes a data object, specifying the identifications (IDs), or filenames, of the data items to be uploaded in a current transaction. The data object may be a JavaScript Object Notation (JSON) formatted object, an XML object, or another data object. One or more data items may be uploaded in a single transaction.

In an example, the transmitting agent then transmits each portion of a data item separately to the receiving agent. Each portion is transmitted with a header that indicates that a portion is being transmitted, such as, the request, "X-Upload-Action='upload_data.'" Along with each portion of the data item, additional information may be transmitted in a header, a JSON object, or other data object. The additional information includes a transaction identifier, which indicates which portions belong to a same transaction and may be provided by the receiving agent to the transmitting agent. The additional information also includes a portion identifier and a filename, which identifies the portion and the data item, and is used by a receiving agent to aggregate the portions into complete data items. The additional information also includes a checksum, which is used by the receiving agent to verify successful receipt of the portion. Each portion is transmitted as a separate request to the receiving agent.

In an embodiment, transmission of different portions is spaced out with time intervals between transmissions. The time intervals may be statically or dynamically configured. For example, the transmission of any portion is initiated when a level network congestion is detected to be below a particular threshold value.

In an embodiment, multiple data items are being transmitted in a same transaction. When all portions of a data item are transmitted, the transmitting agent transmits a completion message, indicating that transmission of that data item is completed. For example, when all portions of all data items are transmitted, the transmitting agent transmits a commit message, indicating that the entire transaction is complete. In an example, an HTTP header of a commit message includes the request, "X-Upload-Action='upload_commit_transaction.'"

In an embodiment, an inquiry is made as to whether any error messages are returned from the receiving agent (Operation 210). An error message may be received any time during the transmission of portions. In an example, an error message is received after transmission of one of a plurality of data items is completed. In another example, an error message is received after transmission of all data items is completed.

In an embodiment, if an error message is received, then one or more portions of data items are transmitted again, returning to Operation 208. In an example, a portion corresponding to the error message is transmitted again. In another example, all portions of a data item are transmitted again. In another example, all portions of all data items in a transaction are transmitted again.

In another embodiment (not shown), if an error message is received, an inquiry is made as to whether re-transmission is necessary. For example, if a data item is unimportant, the transmitting agent may decide not to re-transmit the data item.

Referring back to Operation 204, if a second transport mechanism is selected, then the data items are transmitted from the transmitting agent to the receiving agent using the second transport mechanism (Operation 212). One or more data items may be transmitted in a single request or command. In an example, an entire data item is enclosed in a body of an HTTP POST request. Multiple data items are transmitted through multiple POST requests.

In an example, a POST request involves transmitting the data items to an intermediary, which then forwards the data items to a receiving agent. The intermediary stores the data items until safe receipt by the receiving agent is confirmed. If no confirmation is received within a specified time period, the intermediary may attempt to transmit the data items again.

In an embodiment, an inquiry is made as to whether any error messages are returned from the receiving agent (Operation 214). An error message may be received any time during the transmission of data items. In an example, an error message is received after transmission of one of a plurality of data items is completed. In another example, an error message is received after transmission of all data items is completed.

In an embodiment, if an error message is received, then one or more data items are transmitted again (Operation 212). In another embodiment, an inquiry is made as to whether re-transmission of the data items is necessary.

In an embodiment, if no error messages are received from Operation 210 or Operation 214, then a local copy of the transmitted data items are optionally deleted (Operation 216). In an example, deletion occurs after receipt of a confirmation message, indicating the data items have been successfully transmitted to the receiving agent. Deleting may include writing over the memory locations originally storing the data items, purging memory locations originally storing the data items, and/or deleting pointers or indexes referencing the data items.

D. Select a Data Repository to Store Data Items

Figure 3A:
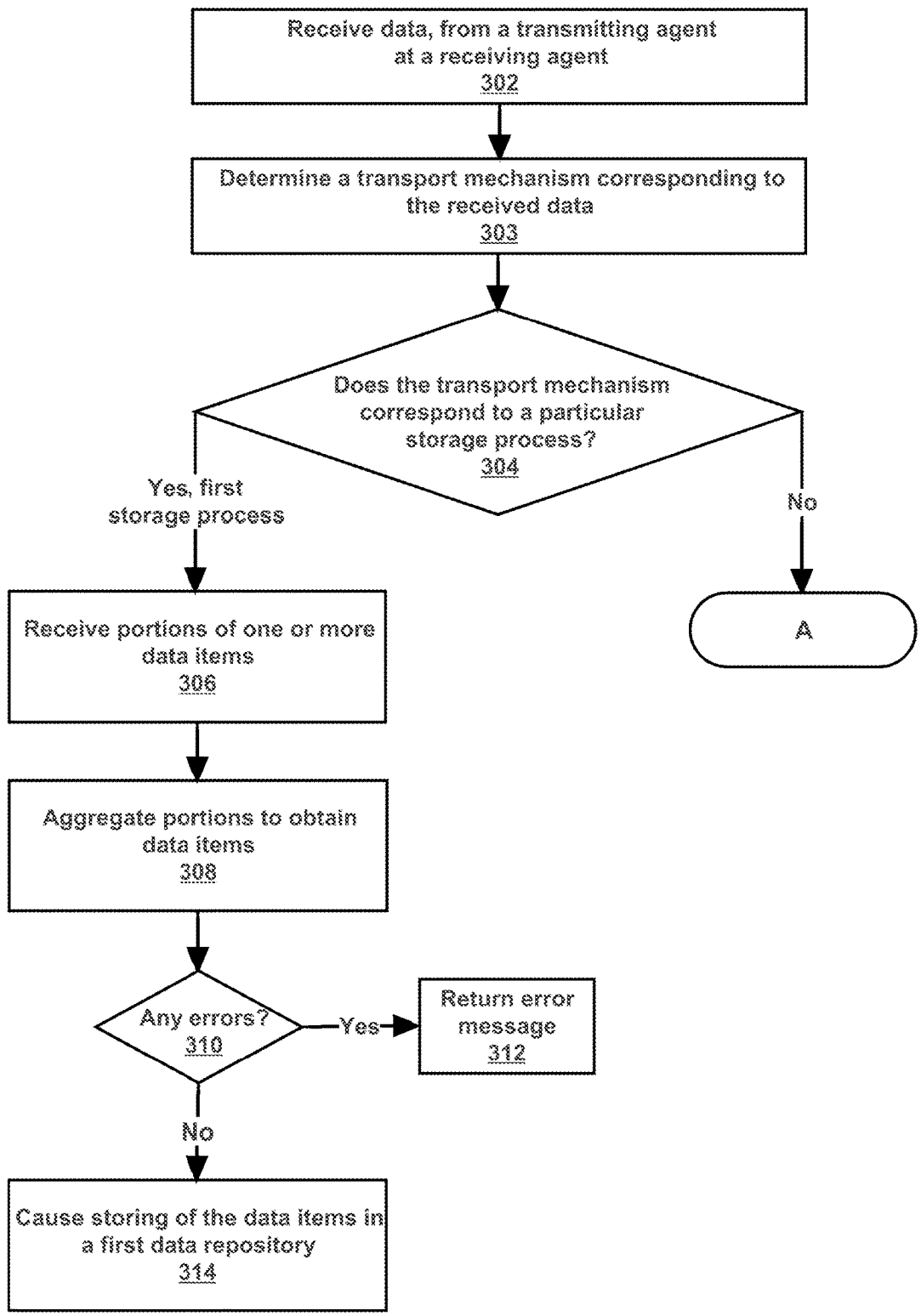
FIGS. 3A-3B show an example set of operations for storing data items in accordance with one or more embodiments.
Figure 3B:
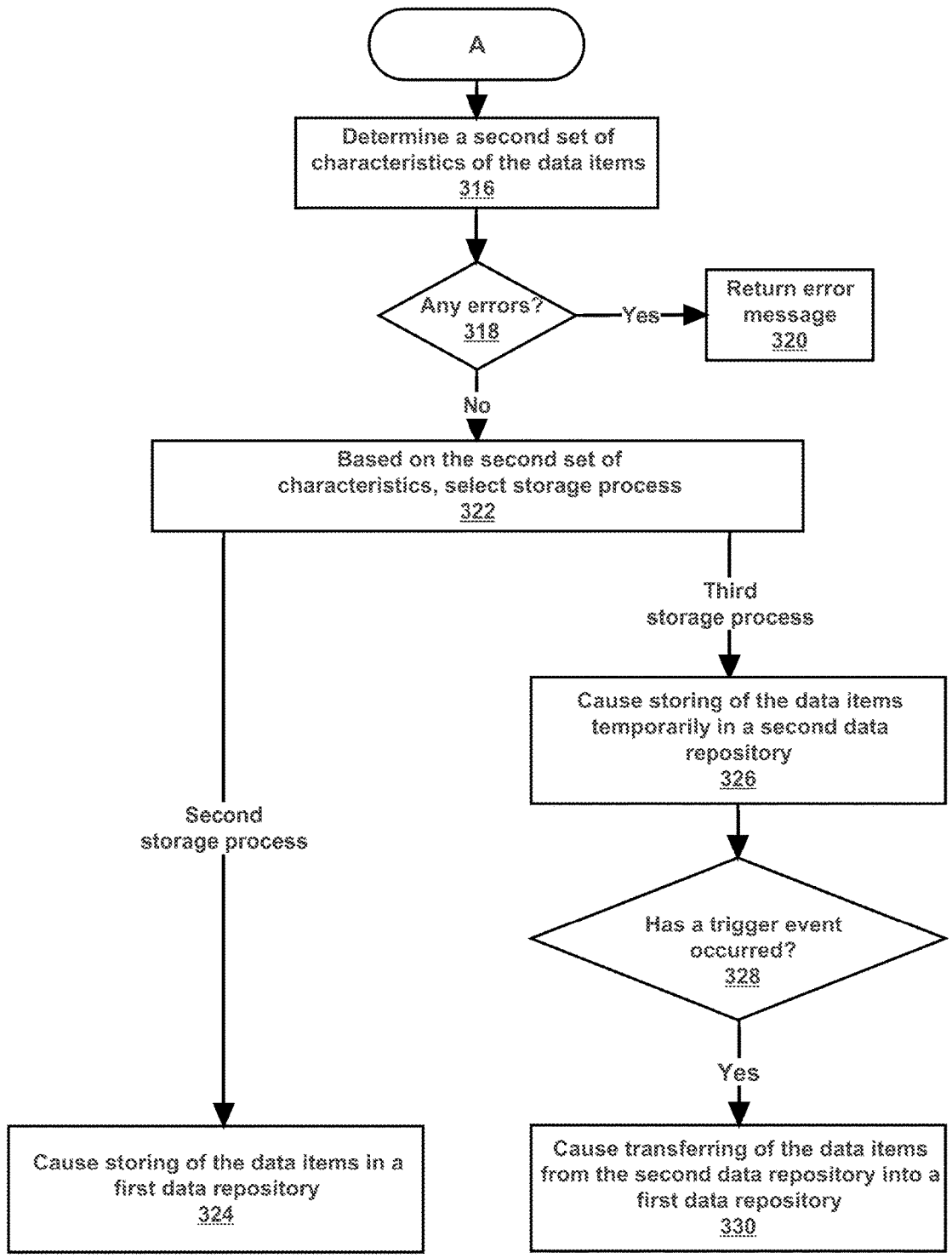

FIGS. 3A-3B illustrates an example set of operations for storing data items in accordance with one or more embodiments. One or more operations illustrated in FIGS. 3A-3B may be modified, rearranged, or omitted all together. Accordingly, the particular sequence of operations illustrated in FIGS. 3A-3B should not be construed as limiting the scope of one or more embodiments.

Initially, data is received from a transmitting agent at a receiving agent (Operation 302). This initial data may include one or more data items (or a portion thereof) to be stored by the receiving agent, meta-data corresponding to the data items, header data, a notification, a message, an upload or file transfer request to the receiving agent and/or instructions or details relating to the request.

In an example, the received data includes a request for a particular type of upload transaction as well as information about data items to be uploaded. For example, an HTTP header includes the request, "X-Upload-Action='upload_start_transaction.'" A JSON formatted object, or another data object, includes filenames of the data items to be uploaded in the current transaction. In this example, a data item, or a portion thereof, is not included in the data initially received.

In another example, the received data includes a request for a particular type of upload transaction as well as at least a portion of a data item to be uploaded. For example, an HTTP header includes the request, "X-Upload-Action='upload_data.'" A JSON object, or other data object, includes a filename and a portion identifier of the portion enclosed in the received data.

In another example, the received data includes a request for a particular type of upload transaction as well as one or more entire data items to be uploaded. For example, an HTTP POST request is received, and a data item to be uploaded is enclosed.

In an embodiment, a transport mechanism corresponding to the received data is determined (Operation 303). The received data is compared to a candidate set of transport mechanisms that are recognized by the receiving agent. For example, a particular request included in the received data indicates that a particular transport mechanism is being used.

In an example, the received data includes a particular file transfer request, such as, "X-Upload-Action='upload_start_transaction.'" The receiving agent recognizes the received data as a request to upload portions of data items separately, which corresponds to a "Chunk and Stream" transport mechanism.

In another example, the received data includes another file transfer request, such as "POST." The receiving agent recognizes the received data as a request to upload one or more entire data items, which corresponds to a "Store and Forward" transport mechanism.

In an embodiment, an inquiry is made as to whether a particular storage process corresponds to the transport mechanism being used (Operation 304). In an embodiment, a lookup table maps transport mechanisms to storage processes. The lookup table is used to determine if a particular storage process corresponds to the transport mechanism being used, or if multiple storage processes corresponds to the transport mechanism being used. If a particular storage process corresponds to the transport mechanism being used, then the particular storage process may be selected directly based on the transport mechanism being used. If multiple storage processes correspond to the transport mechanism being used, then further analyses of the characteristics of the data items and/or other information is necessary for selection of a storage process. Any number of storage processes may be available in the lookup table.

In an example, a lookup table maps a "Chunk and Stream" transport mechanism to a first storage process, and the first storage process may be selected without further analysis of the characteristics of the data items (or the portions thereof). This mapping is due to the assumption that the partitioning operation of the "Chunk and Stream" transport mechanism guarantees that each portion has a size within a certain range. Thus, additional information is not necessary for selection of a storage process.

In another example, a lookup table maps a "Store and Forward" transport mechanism to multiple storage processes, and further analysis of the characteristics of the data items is necessary for selection of a storage process. There is no mapping to a single storage process for the "Store and Forward" transport mechanism because, even though use of the "Store and Forward" transport mechanism indicates that the data item has a size below a certain threshold value, the size is not known to be within a particular range. More information about the data items is necessary for selection of a storage process.

In an embodiment, if a particular first storage process corresponds to the transport mechanism being used, then portions of one or more data items are received (Operation 306). Each portion is accompanied by a separate request that indicates that a portion is to be uploaded, such as, "X-Upload-Action='upload_data.'" In an example, each portion is stored at a temporary file location of a first data repository. The first data repository may be a hard disk file system and/or a distributed file system.

Additional information may be received with each portion. In an example, a portion identifier and a filename is received with each portion. The portion identifier identifies which portion is being received, and the filename indicates to which data item the portion belongs. For example, the portion identifier may be appended to the filename to serve as an address of the temporary memory location at which the portion is stored. The portion identifier and the filename are also used by the receiving agent to aggregate portions into a complete data item.

In an example, a transaction identifier is received with each portion. The transaction identifier is provided by the receiving agent to the transmitting agent after the receiving agent determines that the first transport mechanism is being used, and is to be included in the transmission of each portion of data items in the current transaction. The transaction identifier identifies which portions belong to a same transaction.

In an example, a checksum is received with each portion. The receiving agent verifies that the checksum matches with the portion it has received. If there is no match, then an error message indicating erroneous data transmission may be returned to the transmitting agent.

In an example, a timeout timer is updated to reflect a time at which the last portion was received, which restarts the timeout window. A timeout window may be, for example, thirty minutes. If the next portion of a data item is not received within the timeout window, then a timeout error message may be returned to the transmitting agent.

In an embodiment, continuing with the first storage process, portions are aggregated to obtain one or more data items (Operation 308). In an example, the portions are aggregated after a completion message is received from the transmitting agent. The completion message is transmitted by the transmitting agent after the last portion of a data item is transmitted. The completion message includes the transaction identifier as well as the total number of portions corresponding to the data item. The receiving agent verifies that the number of portions received matches the total number of portions indicated in the completion message.

In an example, the portions are aggregated into a single data item. In a Hadoop Distributed File System, for example, a FileUtil.copyMerge( ) command may be used to aggregate portions into a single data item.

In an embodiment, an inquiry is made as to whether any errors are detected (Operation 310). An error may be detected at any time during the receipt and/or aggregation of portions. For example, an error is detected if the portion received does not match the checksum. As another example, an error occurs during aggregation of the portions into a single data item.

In an embodiment, if an error is detected, an error message is returned to the transmitting agent (Operation 312). An error message may be returned at any time during the receipt and/or aggregation of portions. For example, an error message is returned after receipt of a particular portion, if this particular portion does not match the checksum received with the particular portion. In another example, an error message is returned after an attempt to aggregate the portions.

In an example, an inquiry is made as to whether a request for the transmitting agent to re-transmit the portion (or portions) is necessary. If the data items are important or urgent, then a request to re-transmit is sent to the transmitting agent immediately. If the data items are not important or not urgent, then the receiving agent requests the transmitting agent to re-transmit the data items at a later time, or does not request re-transmission.

In an embodiment, if no errors are detected, then storage of the data items in the first data repository is caused (Operation 314). The data items are stored at the first data repository without being temporarily stored at a second data repository. In an example, the first data repository is a hard disk file system or a distributed file system, and the second data repository is a buffer.

In an example, the data items are stored in the same data repository in which the separate portions were temporarily stored. After the complete data items are stored, the separate portions stored at the temporary file locations are deleted. Further, a successful response is returned to the transmitting agent. An HTTP status code of 200 or 201, for example, may be returned, indicating that the request has been fulfilled and/or resulted in a new resource being created.

In an example, each data item is associated with an object identifier which is mapped to the storage location of the data item at the first data repository. In an example, the object identifiers of data items are sent to a service or application that performs analyses on the data items, thereby enabling the service to retrieve the data items from the first data repository using the object identifiers. In another example, the object identifiers are sent to a messaging system, such as kafka or another feed, which then notifies one or more services of the data items. The object identifiers may be sent to the messaging system in one or more JSON objects.

In an example, each data item is tagged with a tenant identifier, as data items of different tenants are stored at the first data repository. In an example, a tenant identifier may be used by a service or application to retrieve data items relevant to a particular tenant.

Returning to the inquiry made at Operation 304, if no particular storage process corresponds to the transport mechanism is being used, then a second set of one or more characteristics of the data items is determined (Operation 316). In one example, a size of a data item is determined. In another example, characteristics are extracted from the meta-data of a data item, such as a priority flag associated with the data item, a tenant identifier, or other attributes. In another example, characteristics are determined by analyzing the way a data item was produced or transmitted, or the way the data item is to be stored or retrieved. For example, data items are transmitted at a certain data rate. As another example, a block of data items are configured to be sequentially accessed and processed by a service. The second set of characteristics may or may not overlap with the first set of characteristics determined at Operation 202.

In an embodiment, an inquiry is made as to whether any errors are detected (Operation 318). An error may be detected at any time. In an example, data initially received at Operation 302 includes one or more data items to be uploaded. An error may be detected with the data items being received at Operation 302.

In an embodiment, if an error is detected, an error message is returned to the transmitting agent (Operation 320). An error message may be returned at any time. For example, an error message is returned after one or more data items are received at Operation 302. A request for the transmitting agent to re-transmit the data items may or may not be made.

In an embodiment, if no errors are detected, a storage process is selected based on the second set of characteristics of the data items (Operation 322). In an example, a lookup table maps characteristics of data items to suitable storage processes. The lookup table is used to select the storage process for storing a data item based on the characteristics of the data item. For example, the lookup table indicates that a data item of a certain priority type is to be stored using a particular storage process. In another example, a data item size greater than a threshold value maps to a second storage process, while a data item size smaller than the threshold value maps to a third storage process. The threshold value for selecting a storage process may or may not be the same as the threshold value for selecting a transport mechanism used at Operation 204.

In an example, a second storage process, as illustrated in FIG. 3B, includes storing the data items directly to a hard disk file system or a distributed file system, without temporarily storing the data items at a buffer. This storage process is suitable for data items of a large size, as this storage process is more efficient and requires less overhead.

In an example, a third storage process, as illustrated in FIG. 3B, includes storing the data items temporarily at a buffer, and then transferring the data items to a file system. Multiple data items are collected at the buffer, which are then transferred to the file system in one request or command. This storage process is suitable for data items of a small size, as separate accesses to the file system is inefficient.

In an embodiment, if a second storage process is selected, then storage of the data items in a first data repository is caused (Operation 324). The data items are stored at the first data repository without being temporarily stored at a second data repository. Storing directly into the first data repository without temporary storage in the second data repository is similar to the first storage process as described above with reference to Operation 314. In an example, the first data repository is a hard disk file system or a distributed file system, and the second data repository is a buffer. In an example, a same data repository is used at Operations 314 and 324.

In an example, a successful response is returned to the transmitting agent. An HTTP status code of 200 or 201, for example, may be returned, indicating that the request has been fulfilled and/or resulted in a new resource being created.

In an example, each data item is associated with an object identifier or address, indicating the storage location at the first data repository. In an example, the object identifiers of data items, as well as corresponding filenames, are sent to a service or application that performs analyses on the data items. In another example, the object identifiers are sent to a messaging system, such as kafka or another feed, which then notifies one or more services of the data items. In an example, each data item is tagged with a tenant identifier, as data items of different tenants are stored at the first data repository.

In an embodiment, if a third storage process is selected, then storage of the data items temporarily in a second data repository is caused (Operation 326). In an example, the second data repository is a buffer, such as an in-memory buffer local to the receiving agent. In an example, the data items are tagged with tenant identifiers in the buffer. In an example, a successful response, such as an HTTP status code of 200 or 201, is returned to the transmitting agent.

In an embodiment, an inquiry is made as to whether a trigger event for transferring data items from the second data repository has occurred (Operation 328). Before the trigger event occurs, the second data repository collects data items received via separate requests from the transmitting agent at the receiving agent, such as, through multiple performances of Operation 302. In an example, the data items are received via separate requests from different tenants, and each data item is tagged with a tenant identifier. If a trigger event does not occur, then the data items remain temporarily stored in the second data repository.

One example trigger event is that an amount of data stored at the buffer exceeds a threshold value. Another trigger event is that an amount of time that a particular data item has been stored at the buffer exceeds a threshold value. Another trigger event is that a data item that is tagged as high priority has been received by the buffer. Other factors that a trigger event may depend on include an amount of time that has elapsed since the last transfer of data from the second data repository to the first data repository, and/or the receipt of a data item belonging to a particular tenant.

In an embodiment, continuing with the third storage process, if a trigger event occurs, transferring of the data items from the second data repository into the first data repository is caused (Operation 330). In an example, all data items, which are received via multiple transmission from a transmitting agent and are stored in the second data repository, are transferred into the first data repository in one request or command. In an example, a same data repository is used at Operations 314, 324, and 330. The first data repository may be a hard drive file system or a distributed file system.

In an example, a successful response is returned to the transmitting agent. An HTTP status code of 200 or 201, for example, may be returned, indicating that the request has been fulfilled and/or resulted in a new resource being created.

In an example, each data item is associated with an object identifier or address, indicating the storage location at the first data repository. In an example, the object identifiers of data items, as well as corresponding filenames, are sent to a service or application that performs analyses on the data items. In another example, the object identifiers are sent to a messaging system, such as kafka or another feed, which then notifies one or more services of the data items. In an example, each data item is tagged with a tenant identifier, as data items of different tenants are stored at the first data repository.

In an example, the data items are deleted from the second data repository. Deleting may include writing over the memory locations originally storing the data items, purging memory locations originally storing the data items, and/or deleting pointers or indexes referencing the data items.

E. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Features, components, and/or operations described with regard to this example embodiment are not necessarily applicable to other embodiments.

In an example, ABC Company and XYZ Company are both tenants of a cloud computing environment utilizing a data pipeline. At ABC Company, a detailed log on the performance of an on-premise system is generated. A log is transmitted from a transmitting agent at ABC Company to the data pipeline every 24 hours and typically includes a large amount of data. At XYZ Company, a report on incidents resulting from an on-premise system is generated. An incident report is transmitted from a transmitting agent at XYZ Company to the data pipeline every 24 hours and typically includes a small amount of data. Cloud services perform analyses on the log of ABC Company and the incident report of XYZ Company.

In one instance, a transmitting agent at ABC Company determines a first characteristic of a particular log, named "January 1, 2015 Log." Specifically, the size is determined to be 80,000 KB. The transmitting agent determines that this log exceeds the threshold of 50,000 KB and is therefore to be transmitted via a "Chunk and Stream" transport mechanism. The transmitting agent partitions the log into two portions, each with 40,000 KB.

The transmitting agent at ABC Company transmits to a receiving agent of the data pipeline an HTTP header including the request, "X-Upload-Action='upload_start_transaction,'" which indicates the start of a transmission of multiple portions of a data item. The transmitting agent also transmits a JSON object, including the filename of the log, "January 1, 2015 Log."

The receiving agent of the data pipeline determines that a "Chunk and Stream" transport mechanism is being used based on the "X-Upload-Action='upload_start_transaction'" request in the HTTP header. The receiving agent transmits a transaction identifier to the transmitting agent, "Transaction #128."

The receiving agent further determines that a first storage process corresponds to the "Chunk and Stream" transport mechanism. The first storage process involves storing data items received in a distributed file system without temporarily storing the data items in a buffer.

The transmitting agent of ABC Company transmits to the receiving agent each portion of the log. The transmitting agent transmits the first portion of the log, with an HTTP header including the request, "X-Upload-Action='upload_data,'" which indicates a portion of a data item is being transmitted, and the transaction identifier, "Transaction #128." The transmitting agent also transmits a JSON object, including the filename, "January 1, 2015 Log," and a portion identifier, "1." The transmitting agent then transmits the second portion of the log, with an HTTP header including the request "X-Upload-Action='upload_data,'" and the transaction identifier, "Transaction #128." The transmitting agent also transmits a JSON object, including the filename, "January 1, 2015 Log," and a portion identifier, "2."

The receiving agent stores each of the portions in the distributed file system at a temporary file location. The temporary file location is indicated by the transaction identifier, the filename, and the portion identifier. The first portion is stored at a temporary file location indicated by Transaction #128/January 1, 2015 Log.00001, and the second portion is stored at another temporary file location indicated by Transaction #128/January 1, 2015 Log.00002.

The transmitting agent of ABC Company then transmits a completion message, indicating all portions of the log have been transmitted. The HTTP header of the completion message includes the request "X-Upload-Action='upload_data,'" and the transaction identifier, "Transaction #128." A JSON object includes the filename, "January 1, 2015 Log," and a portion identifier, "−1," which indicates that the final portion was transmitted. The JSON object also includes a number of portions of transmitted, which is "2" in this example.

The receiving agent verifies the number of portions received matches the number specified in the completion message. If no, then an error message is returned. If yes, then the receiving agent aggregates the portions into a single data item. The receiving agent obtains the complete "January 1, 2015 Log" from the two portions via a FileUtil.copy Merge( ) command and stores the log as one data item in the distributed file system. The log is stored with an object identifier, "Object #32," and is tagged with a tenant identifier, "ABC Company." Upon successful storage, an HTTP status code of 201 is returned to the transmitting agent. The log is thus stored in the distributed file system without having been temporarily stored in a buffer.

The transmitting agent of ABC Company then transmits a commit message, indicating the entire transaction is complete. The HTTP header of the commit message includes the request "X-Upload-Action='upload_commit_transaction,'" and the transaction identifier, "Transaction #128."

After receiving the commit message, the receiving agent deletes the two separate portions from the distributed file system. The receiving agent submits a notification to a kafka messaging system, including the object identifier of the log, "Object #32," and the filename, "January 1, 2015 Log." Cloud services receive the object identifier and the filename from the kafka messaging system and are able to retrieve the log from the distributed file system based on this information. The receiving agent returns an HTTP status code of 200 to the transmitting agent of ABC Company, indicating successful upload. The transmitting agent of ABC Company deletes local copies of the log.

In another instance, a transmitting agent at XYZ Company determines a first characteristic of a particular incident report, named "January 1, 2015 Report." Specifically, a size is determined by the transmitting agent to be 5,000 KB. The transmitting agent determines that this report is below the threshold of 50,000 KB and is therefore to be transmitted via a "Store and Forward" transport mechanism. The transmitting agent sends a POST request, with the report enclosed in the body of the request. The POST request may be transmitted through one or more intermediary devices before arriving at the receiving agent of the data pipeline.

The receiving agent of the data pipeline determines that the "Store and Forward" transport mechanism is used based on the POST request in the HTTP header. The receiving agent determines that there is no particular storage process that corresponds to the "Store and Forward" transport mechanism. The receiving agent determines a second characteristic of the report. Specifically, a size is determined by the receiving agent to be 5,000 KB. The receiving agent determines that this report is below the threshold of 20,000 KB and is therefore to be stored via a third storage process rather than a second storage process. The third storage process involves temporarily storing data items in an in-memory buffer, while the second storage process does not.

Implementing the third storage process, the receiving agent of the data pipeline stores the report enclosed in the POST request temporarily in an in-memory buffer. The report is tagged with a tenant identifier, "XYZ Company." An HTTP status code of 201 is returned to the transmitting agent of XYZ Company.

The receiving agent stores other data items from XYZ Company as well as other tenants in the in-memory buffer until the receiving agent determines that an amount of data stored in the buffer exceeds a threshold of 40,000 KB. When the amount of data stored in the buffer exceeds 40,000 KB, all data stored in the buffer, including "January 1, 2015 Report," is transferred to the distributed file system. The report is stored in the distributed file system with an object identifier, "Object #33," and is tagged with the tenant identifier, "XYZ Company." Upon successful storage, an HTTP status code of 201 is returned to the transmitting agent of XYZ Company. The report is thus stored in the distributed file system after having been temporarily stored in the buffer.

The receiving agent deletes all data originally stored in the buffer. The receiving agent submits a notification to a kafka messaging system, including the object identifier of the report, "Object #33," and the filename, "January 1, 2015 Report." Cloud services receive the object identifier and the filename from the kafka messaging system and are able to retrieve the report from the distributed file system based on this information. The receiving agent returns an HTTP status code of 200 to the transmitting agent of XYZ Company, indicating successful upload. The transmitting agent of XYZ Company deletes local copies of the report, if not already deleted.

F. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

G. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
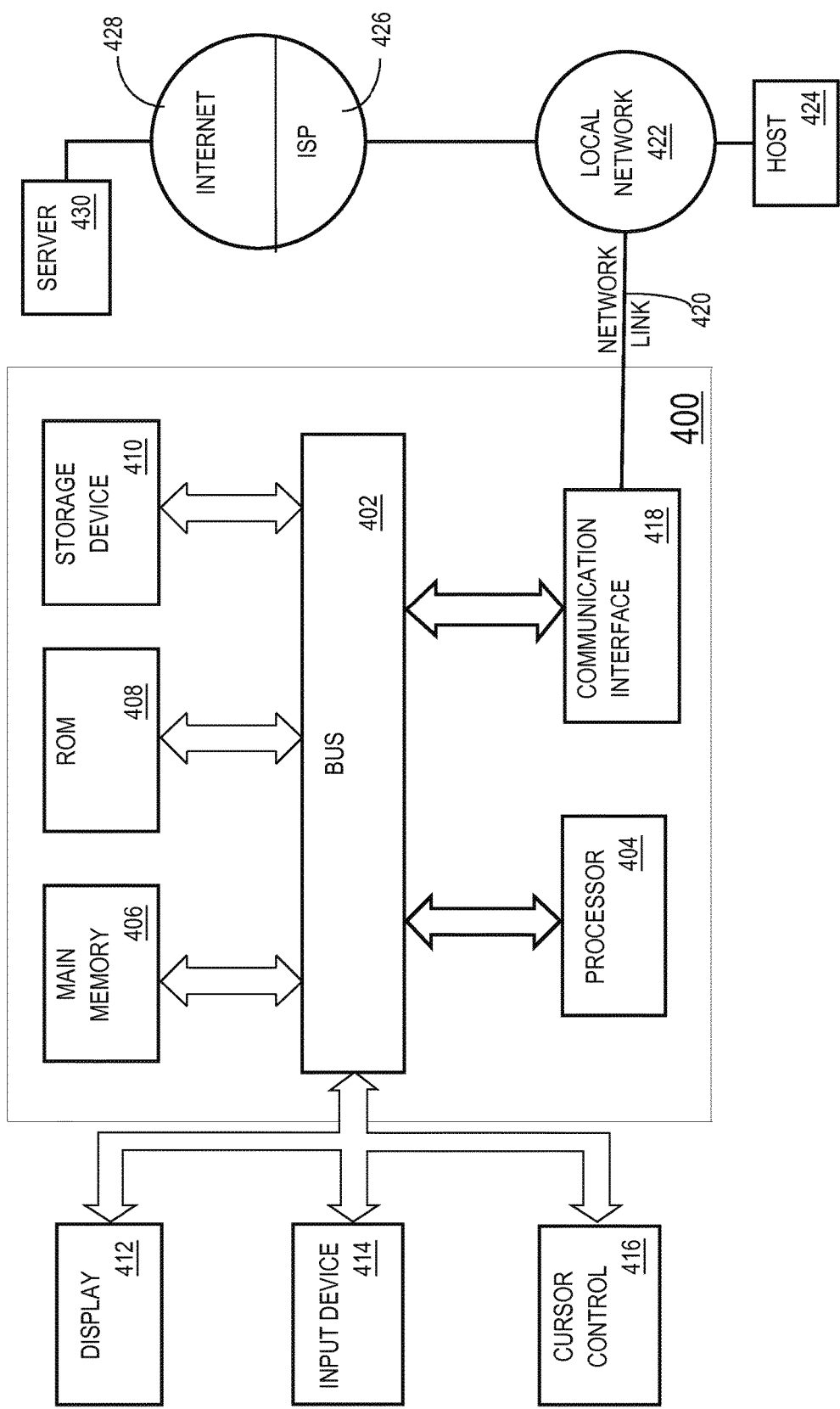
FIG. 4 is a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410.

Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
    a transmitting agent configured to perform a first set of operations comprising:
        determining a first set of one or more characteristics of a first data item to be transmitted from the transmitting agent to a receiving agent;
        determining a second set of one or more characteristics of a second data item to be transmitted from the transmitting agent to the receiving agent;
        based on the first set of characteristics of the first data item, selecting a first transport mechanism from a plurality of transport mechanisms to transport the first data item from the transmitting agent to the receiving agent;
        based on the second set of characteristics of the second data item, selecting a second transport mechanism from the plurality of transport mechanisms to transport the second data item from the transmitting agent to the receiving agent, wherein the first transport mechanism is different than the second transport mechanism;
        transmitting the first data item to the receiving agent using the first transport mechanism and the second data item to the receiving agent using the second transport mechanism; and
    the receiving agent configured to perform a second set of operations comprising:
        responsive to receiving the first data item from the transmitting agent via the first transport mechanism:
            causing storing of the first data item into a first data repository without temporarily storing the first data item in a second data repository;
        responsive to receiving the second data item from the transmitting agent via the second transport mechanism:
            based on a third set of one or more characteristics of the second data item, determining to perform and performing one of:
                causing storing of the second data item into the first data repository without temporarily storing the second data item in the second data repository; or
                causing storing of the second data item temporarily into the second data repository and causing transferring of the second data item from the second data repository into the first data repository.

2. The system of claim 1, wherein the transmitting agent is executing on a client device and the receiving agent is executing on a server different than the client device.

3. The system of claim 1, wherein the second set of characteristics and the third set of characteristics are identical.

4. The system of claim 1, wherein the second set of characteristics and the third set of characteristics are mutually exclusive.

5. The system of claim 1, wherein the first set of characteristics indicates a size of the first data item, and the first transport mechanism is selected by the transmitting agent for transmitting the first data item if the size of the first data item is greater than a threshold value.

6. The system of claim 1, wherein the first transport mechanism uses a different communications protocol than the second transport mechanism.

7. The system of claim 1, wherein transmitting the first data item using the first transport mechanism comprises:
partitioning the first data item into a plurality of portions, each portion identified by a respective identifier, and each portion comprising a respective plurality of packets;
transmitting each portion of the first data item from the transmitting agent to the receiving agent,
wherein the receiving agent aggregates the plurality of portions, received via the first transport mechanism, to obtain the first data item.

8. The system of claim 1, wherein transmitting the second data item using the second transport mechanism comprises transmitting the second data item using a HyperText Transfer Protocol (HTTP) POST request.

9. The system of claim 1, wherein the first set of operations further comprise:
prior to transmitting the first data item using the first transport mechanism:
transmitting, by the transmitting agent to the receiving agent, a notification identifying the first transport mechanism to be used for transmitting the first data item.

10. The system of claim 1, wherein the first set of operations further comprise:
prior to transmitting the first data item using the first transport mechanism:
transmitting, by the transmitting agent to the receiving agent, a HyperText Transfer Protocol (HTTP) header identifying the first transport mechanism to be used for transmitting the first data item.

11. The system of claim 1, wherein the first data item includes a header that indicates the first transport mechanism is being used for transmitting the first data item.

12. The system of claim 1, wherein the first data repository comprises non-volatile memory and the second data repository comprises volatile memory.

13. The system of claim 1, wherein the first data repository comprises a Hard Disk File System (HDFS) and the second data repository comprises an in-memory buffer implemented on a same device as the receiving agent.

14. The system of claim 1, wherein the second set of operations further comprise:
causing transferring of the second data item from the second data repository into the first data repository responsive to:
determining that an amount of data stored in the second data repository is above a threshold value.

15. A method comprising:
determining, by a transmitting agent, a first set of one or more characteristics of a first data item to be transmitted from the transmitting agent to a receiving agent;
determining, by the transmitting agent, a second set of one or more characteristics of a second data item to be transmitted from the transmitting agent to the receiving agent;
based on the first set of characteristics of the first data item, selecting a first transport mechanism from a plurality of transport mechanisms to transport the first data item from the transmitting agent to the receiving agent;
based on the second set of characteristics of the second data item, selecting a second transport mechanism from the plurality of transport mechanisms to transport the second data item from the transmitting agent to the receiving agent, wherein the first transport mechanism is different than the second transport mechanism;
transmitting, from the transmitting agent to the receiving agent, the first data item using the first transport mechanism and the second data item using the second transport mechanism;
responsive to receiving the first data item from the transmitting agent at the receiving agent via the first transport mechanism:
causing, by the receiving agent, storing of the first data item into a first data repository without temporarily storing the first data item in a second data repository; and
responsive to receiving the second data item from the transmitting agent at the receiving agent via the second transport mechanism:
based on a third set of one or more characteristics of the second data item, determining to perform and performing one of:
causing, by the receiving agent, storing of the second data item into the first data repository without temporarily storing the second data item in the second data repository; or
causing, by the receiving agent, storing of the second data item temporarily into the second data repository and causing transferring of the second data item from the second data repository into the first data repository.

16. The method of claim 15, wherein the transmitting agent is executing on a client device and the receiving agent is executing on a server different than the client device.

17. The method of claim 15, wherein the second set of characteristics and the third set of characteristics are identical.

18. The method of claim 15, wherein the second set of characteristics and the third set of characteristics are mutually exclusive.

19. The method of claim 15, wherein the first set of characteristics indicates a size of the first data item, and the first transport mechanism is selected by the transmitting agent for transmitting the first data item if the size of the first data item is greater than a threshold value.

20. The method of claim 15, wherein the first transport mechanism uses a different communications protocol than the second transport mechanism.

\* \* \* \* \*